June 2, 1959  J. J. ZACH  2,888,880

RAILWAY VEHICLE TRUCK

Filed Sept. 10, 1956

INVENTOR.
JULIUS J. ZACH
BY
Francis T. Burgess
ATTORNEY

United States Patent Office 2,888,880
Patented June 2, 1959

2,888,880
RAILWAY VEHICLE TRUCK

Julius J. Zach, St. Louis, Mo., assignor to General Steel Castings Corporation, Granite City, Ill., a corporation of Delaware Application September 10, 1956, Serial No. 608,970

2 Claims. (Cl. 105—132.1)

The invention relates to railway vehicle trucks, and more particularly to trucks provided with driving axle boxes operatively connected to driving means carried by the associated vehicle underframe.

In the usual structure of this type, the torque reaction of the driving axle box is taken by a torque arm rigidly connected at one end to the box and pivotally at the other end to the truck frame. Since in most cases the truck frame is either directly or indirectly spring-supported on the journal boxes and accordingly is vertically movable relative thereto, during all such movements a driving axle box with its torque arm thus mounted will oscillate on the axle, resulting in additional wear to the driving gears and the journal bearings.

It is an object of the invention to provide a mounting for the torque arm such that oscillation of the driving axle box responsive to vertical movements of the frame on the frame-supporting springs will be prevented.

I achieve this object by connecting the driving axle box torque arm to the equalizer, since the equalizer is not sprung relative to the driving axle box and will not impart any independent motion to the driving axle box such as that imparted by the frame in conventional structures.

A further object is to provide a connection between the driving axle box torque arm and the equalizer such that any change in the distance between the axle and the point of connection of the torque arm to the equalizer, due to placing of shims between the box and the equalizer seat, is automatically compensated for.

The foregoing objects and other detailed objects as will be apparent from the following description are attained by the structure illustrated in the accompanying drawings in which.

Figure 1:
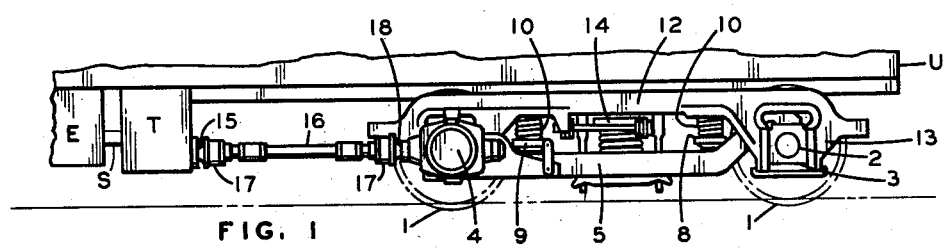
Figure 1 is a side view of a truck embodying the invention and the adjacent portion of a railway vehicle underframe supported thereby.
Figure 3:
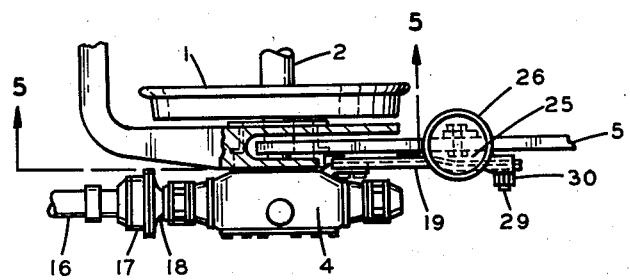
Figure 3 is a top view corresponding to Figure 2 and partially sectionalized along the line 3—3 of Figure 2.
Figure 2:
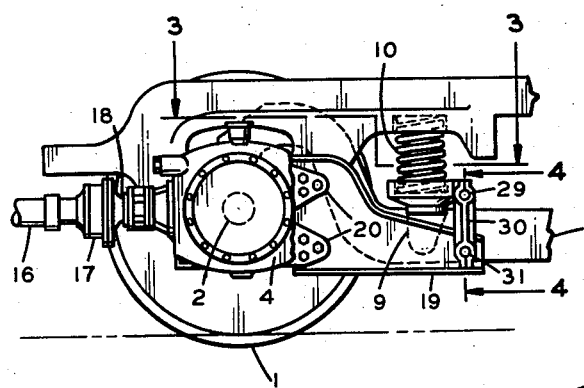
Figure 2 is an enlarged fragmentary side view of a portion of the truck shown in Figure 1.
Figure 4:
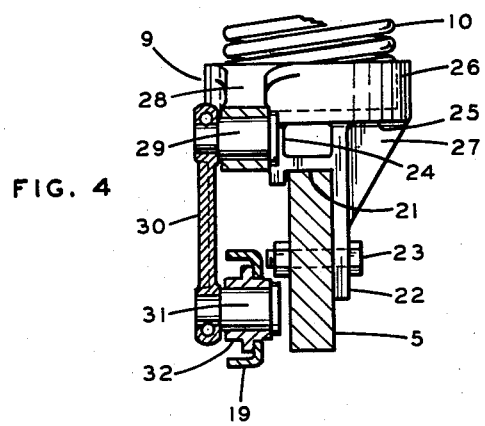
Figure 4 is a fragmentary transverse vertical sectional view of the truck along the line 4—4 of Figure 2.
Figure 5:
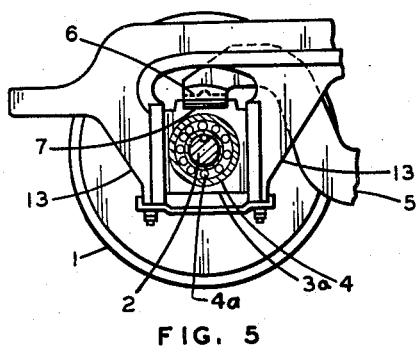
Figure 5 is a longitudinal vertical sectional view along the line 5—5 of Figure 3.

The truck includes the usual wheels 1, axles 2, and journal boxes 3. A driving axle box 4, including journal bearings 4a and hypoid driving gears (not shown), is mounted on the end of one of the axles 2 and is rotatably received within a box-like member 3a (Figure 5). An equalizer 5 of the usual drop type, is heated at each of its ends on equalizer seats 6 which in turn are seated in recesses in the upper surface of the journal boxes 3 and of the member 3a carried by driving axle box 4. For properly adjusting the height of the equalizers and truck frame, one or more shims 7 may be interposed between the upper surfaces of the boxes and the lower surfaces of the equalizer seats.

Spring seats 8 and 9, supported near each end of the dropped intermediate portion of the equalizer, mount coil springs 10, which in turn support the usual rigid truck frame comprising longitudinally extending wheel pieces 12 formed with longitudinally spaced depending pedestal legs 13, between which are slidably received boxes 3 and box-like member 3a.

The car underframe U is pivotably supported on the truck by the usual center plate on swing-motion bolster 14, and supports driving mechanism including an engine E connected by shaft S to transmission T. The output shaft 15 of the transmission T is connected by a longitudinally-extending Cardan shaft 16, including universal joints 17, to the input shaft 18 of driving axle box 4, in such a manner as to permit relative swivelling, vertical and lateral movements between truck and underframe.

The torque reaction of the driving axle box 4 is taken by a longitudinally extending pressed steel arm 19 which is secured at one end by bolts to brackets 20 integral with the driving axle box casing, and at the other end to equalizer spring seat 9.

Equalizer spring seat 9 includes a base 21 which rests on the upper surface of the equalizer, and a depending leg 22 engaging the inside surface of the equalizer, by which the spring seat may be bolted as at 23 to the equalizer. Leg 22 and a vertical web 24, laterally spaced therefrom, extend upwardly from base 21 and are connected at their ends to a disc 25 which forms a seat for spring 10 and is surrounded by a spring-retaining flange 26. A triangular bracing rib 27 connects the inner and lower surfaces respectively of leg 22 and disc 25. To provide a connection for the torque arm 19, a bracket 28 extends longitudinally from the flange 26, outboard of the equalizer, and rotatably journals a pin 29, to the end of which is clamped a link 30, the other end of which is clamped to a corresponding pin 31 journaled in a sleeve 32 rigidly secured to torque arm 19.

Thus any tendency of driving axle box 4 and torque arm 19 to rotate with the axle will be resisted by link 30. Since the equalizer 5 is rigidly supported on driving axle box 4, there will be no rotation or oscillation of the driving axle box about its transverse horizontal axis.

Moreover, if it is necessary to increase or decrease the number or thickness of shims between the journal box 3 and equalizer seat 6, consequent shortening or lengthening of the horizontal distance between the axle and pivot 29 will result. Since torque arm 19 is of fixed length and the axle center is its pivotal axis, any resulting displacement longitudinally of the truck between its outer connecting pin 31 and spring seat pin 29 will be accommodated by link 30.

The details of the structure may be varied substantially without departing from the spirit of the invention and the exclusive use of those modifications coming within the scope of the appended claims is contemplated.

What is claimed is:

1. A railway truck comprising wheel and axle assemblies, structure including a driving axle box carried by an end portion of at least one of said assemblies, journal boxes carried by the other end portions of said assemblies, equalizers extending longitudinally of the truck and non-resiliently supported from said structure and said journal boxes, a truck frame spring-supported from said equalizers and including pairs of longitudinally-spaced vertical pedestal legs slidably receiving said structure and said journal boxes therebetween, a torque arm rigidly secured to said driving axle box and extending longitudinally of the truck therefrom, and a substantially vertical link pivotally connected at its one end to the outer end portion of said torque arm and at its other end to the adjacent equalizer.

2. A railway truck comprising wheel and axle assemblies, structure including a driving axle box carried by an end portion of at least one of said assemblies, journal boxes carried by the other end portion of said assemblies, equalizers extending longitudinally of the truck and non-resiliently supported from said structure and said journal boxes, spring seats secured to said equalizers, springs carried by said spring seats, a truck frame supported on said springs and including pairs of longitudinally-spaced vertical pedestal legs slidably receiving said structure and said journal boxes therebetween, a torque arm rigidly secured to said driving axle box and extending longitudinally of the truck therefrom, and a substantially vertical link pivotally connected at its one end to the outer end portion of said torque arm and at its other end to an adjacent spring seat.

References Cited in the file of this patent

UNITED STATES PATENTS

| | | |
|---|---|---|
| 1,743,514 | Alley et al. | Jan. 14, 1930 |
| 1,888,176 | Latshaw | Nov. 15, 1932 |
| 2,271,027 | Oelkers | Jan. 27, 1942 |